United States Patent
Chen et al.

(10) Patent No.: US 8,935,967 B2
(45) Date of Patent: Jan. 20, 2015

(54) ROLLER ELEMENT RETAINER FOR BALL SCREW DEVICE

(71) Applicant: Hiwin Technologies Corp., Taichung (TW)

(72) Inventors: Yan-Yu Chen, Taichung (TW); Wuteng Hsieh, Taichung (TW)

(73) Assignee: Hiwin Technologies Corp., Situn Taichung (TW)

( * ) Notice: Subject to any disclaimer, the term of this patent is extended or adjusted under 35 U.S.C. 154(b) by 90 days.

(21) Appl. No.: 13/721,187

(22) Filed: Dec. 20, 2012

(65) Prior Publication Data

US 2014/0174232 A1     Jun. 26, 2014

(51) Int. Cl.
*F16H 25/22* (2006.01)

(52) U.S. Cl.
CPC ........ *F16H 25/2223* (2013.01); *F16H 25/2214* (2013.01)
USPC ..................................... 74/424.88; 74/424.83

(58) Field of Classification Search
USPC ................. 74/424.81–424.88; 384/44, 45, 51
See application file for complete search history.

(56) References Cited

U.S. PATENT DOCUMENTS

| | | | |
|---|---|---|---|
| 6,070,479 A * | 6/2000 | Shirai | 74/424.88 |
| 6,089,117 A | 7/2000 | Ebina et al. | |
| 6,481,305 B2 | 11/2002 | Nishimura et al. | |
| 6,499,374 B1 | 12/2002 | Ohga | |
| 6,652,146 B2 | 11/2003 | Lee | |
| 6,733,179 B2 | 5/2004 | Michioka et al. | |
| 7,044,641 B2 | 5/2006 | Scotte et al. | |
| 7,234,368 B1 | 6/2007 | Lin et al. | |
| 8,100,025 B2 * | 1/2012 | Lin | 74/424.88 |
| 2004/0211280 A1 * | 10/2004 | Nishimura et al. | 74/424.82 |
| 2005/0076734 A1 * | 4/2005 | Miyaguchi et al. | 74/424.88 |
| 2005/0247149 A1 * | 11/2005 | Osterlanger et al. | 74/424.88 |
| 2008/0000320 A1 | 1/2008 | Osterlaenger et al. | |
| 2009/0290819 A1 * | 11/2009 | Lin | 384/44 |
| 2012/0137808 A1 * | 6/2012 | Chen et al. | 74/424.88 |

* cited by examiner

*Primary Examiner* — Troy Chambers
*Assistant Examiner* — Emily Cheng
(74) *Attorney, Agent, or Firm* — Charles E. Baxley

(57) ABSTRACT

A motion guide device includes a ball nut attached onto a shaft and having helical grooves for forming a ball guiding raceway between the ball nut and the elongated shaft and for receiving ball bearing elements, a circulating device attached to the ball nut and having a pathway communicative with the raceway for forming an endless ball guiding passage between the ball nut and the elongated shaft and the circulating device and for engaging with bearing elements, and a retaining device includes a shorter chain for engaging into the helical grooves or raceway of the screw shaft and the ball nut, and a longer chain for engaging into the pathway of the circulating device.

4 Claims, 7 Drawing Sheets

ROLLER ELEMENT RETAINER FOR BALL SCREW DEVICE

BACKGROUND OF THE INVENTION

1. Field of the Invention The present invention relates to a ball screw device, and more particularly to a ball screw device including a screw shaft and a ball nut movable relative to each other, and a ball or roller element retaining device attached between the screw shaft and the ball nut for suitably circulating and guiding the ball bearing elements to move through an endless ball guiding passage in the ball screw device or between the two movable members.

2. Description of the Prior Art

Typical motion guide apparatuses, such as the linear motion guide apparatuses comprise two movable members rotatable or movable relative to each other, and a number of ball bearing elements disposed between the two movable members for facilitating the sliding movement between the two movable members, and one or more ball circulating elements attached to the ball nut and communicative with the helical groove portions of the screw shaft and the ball nut for forming an endless ball guiding passage in the ball screw device or between the two movable members and for slidably receiving a number of ball bearing elements.

For example, U.S. Pat. No. 6,652,146 to Lee, U.S. Pat. No. 6,733,179 to Michioka et al., and U.S. Pat. No. 7,044,641 to Scotte et al. disclose three of the typical linear motion guide apparatuses each comprising two movable members movable relative to each other, and a number of ball bearing elements disposed between the two movable members for facilitating the sliding movement between the two movable members, and one or more ball guide devices or circulating elements attached between the two movable members and for slidably receiving a number of ball bearing elements.

For suitably or smoothly guiding or circulating the ball bearing elements through the endless ball circulating channels in the two movable members, the tubular circulating elements or ball guide devices each include a number of spacers coupled together with one or more endless flexible resin connectors for suitably receiving or engaging with the ball bearing elements and for guiding the ball bearing elements to move through the endless ball guiding raceways in and between the two movable members.

However, normally, the ball bearing elements are required to be engaged into the endless flexible coupling members of the ball couplers before the endless flexible coupling members of the ball couplers are fitted and received or engaged into the endless ball guiding raceways in and between the two movable members. For the cited typical linear motion guide apparatuses, the endless flexible coupling members of the ball couplers may be suitably fitted and received or engaged into the endless ball guiding raceways in and between the two movable members.

U.S. Pat. No. 6,481,305 to Nishimura et al., U.S. Pat. No. 6,499,374 to Ohga, and U.S. Pat. No. 7,234,368 to Lin et al. disclose three of the typical ball screw devices each comprising a ball nut pivotally or rotatably coupled onto a screw shaft, and an endless helically running threaded channel or ball guiding raceway provided between the screw shaft and the ball nut for receiving a number of loaded ball bearing elements and for facilitating the sliding movement between the screw shaft and the ball nut, and one or more ball circulating elements attached to the ball nut and communicative with the helical groove portions of the screw shaft and the ball nut for forming the endless helically running threaded channel or ball guiding raceway in the ball screw device or between the screw shaft and the ball nut.

Due to the attachment of the ball circulating elements to the ball nut, the endless flexible coupling members of the ball couplers may not be suitably fitted and received or engaged into the endless ball guiding raceways in and between the screw shaft and the ball nut, such that no flexible coupling members or ball couplers may be used to couple the ball bearing elements together, or the flexible coupling members or ball couplers may not be suitably engaged into the endless ball guiding raceways in and between the screw shaft and the ball nut and also may not be suitably engaged into the ball guiding raceways in the flexible coupling members or the ball couplers.

U.S. Pat. No. 6,089,117 to Ebina et al., U.S. Pat. No. 8,100,025 to Lin, U.S. Patent Application No. US 2008/0000320 to Osterlaenger et al., and U.S. Patent Application No. US 2009/0290819 to Lin disclose several further typical ball screw devices each comprising a ball nut pivotally or rotatably coupled onto a screw shaft, and an endless helically running threaded channel or ball guiding raceway provided between the screw shaft and the ball nut for receiving a number of loaded ball bearing elements and for facilitating the sliding movement between the screw shaft and the ball nut, and one or more ball circulating elements attached to the ball nut and communicative with the helical groove portions of the screw shaft and the ball nut for forming the endless helically running threaded channel or ball guiding raceway in the ball screw device or between the screw shaft and the ball nut.

However, the endless flexible coupling members of the ball couplers also may not be suitably fitted and received or engaged into the endless ball guiding raceways in and between the screw shaft and the ball nut, due to the attachment of the ball circulating elements to the ball nut, such that no flexible coupling members or ball couplers may be used to couple the ball bearing elements together, or the flexible coupling members or ball couplers may not be suitably engaged into the endless ball guiding raceways in and between the screw shaft and the ball nut and also may not be suitably engaged into the ball guiding raceways in the flexible coupling members or the ball couplers.

As also shown in FIG. 7, illustrated is one of the typical ball screw devices comprising one or more ball circulating elements E attached to the ball nut N and communicative with the helical groove portions of the screw shaft S and the ball nut N for forming the endless helically running threaded channel or ball guiding raceway in the ball screw device or between the screw shaft S and the ball nut N.

However, the endless flexible coupling members F of the ball couplers C also may not be suitably fitted and received or engaged into the endless ball guiding raceways in and between the screw shaft S and the ball nut N, due to the attachment of the ball circulating elements E to the ball nut N, and the ball couplers C may be suitably coupled the ball bearing elements B together, or the flexible coupling members F or ball couplers C may not be suitably engaged into the endless ball guiding raceways in and between the screw shaft S and the ball nut N; i.e., the flexible coupling members F of ball couplers C and the ball bearing elements B will be extended out of the ball circulating elements E and thus may not be suitably engaged into the endless ball guiding raceways in and between the screw shaft S and the ball nut N.

The present invention has arisen to mitigate and/or obviate the afore-described disadvantages of the conventional ball screw devices.

SUMMARY OF THE INVENTION

The primary objective of the present invention is to provide a ball screw device including a screw shaft and a ball nut movable relative to each other, and a ball or roller element retaining device attached between the screw shaft and the ball nut for suitably circulating and guiding the ball bearing elements to move through an endless ball guiding passage in the ball screw device or between the two movable members.

In accordance with one aspect of the invention, there is provided a ball screw device comprising an elongated shaft including a helical groove formed on an outer peripheral portion thereof, a ball nut movably attached onto the elongated shaft, and including a bore formed therein for receiving the elongated shaft, and including a helical groove formed therein for forming a ball guiding raceway between the ball nut and the elongated shaft, a circulating device attached to the ball nut and including a pathway formed therein and communicative with the helical grooves and the ball guiding raceway of the screw shaft and the ball nut for forming an endless ball guiding passage between the ball nut and the elongated shaft and the circulating device, a number of bearing elements received and engaged with the endless ball guiding passage of the ball nut and the elongated shaft, and a retaining device including a number of spacers connected together with at least one flexible coupling device to form a number of openings between the spacers and the at least one flexible coupling device and for receiving the bearing elements, and the retaining device includes a first chain for engaging into the helical grooves of the screw shaft and the ball nut, and includes at least one second chain having a length equal to, or no greater than, or no less than that of the circulating device for engaging into the pathway of the circulating device for easily and quickly assembled into the ball nut device.

The second chain includes at least three bearing elements engaged therein. The second chain and the circulating device has a length difference ranged between one to three times of a diameter of the bearing element.

The first chain includes a length equal to, or no greater than, or no less than that of the ball guiding raceway between the ball nut and the elongated shaft.

The first chain and the ball guiding raceway between the ball nut and the elongated shaft has a length difference ranged between one to three times of a diameter of the bearing element.

An additional bearing element may further be provided and disposed between two adjacent ends of the first chain and the at least one second chain.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
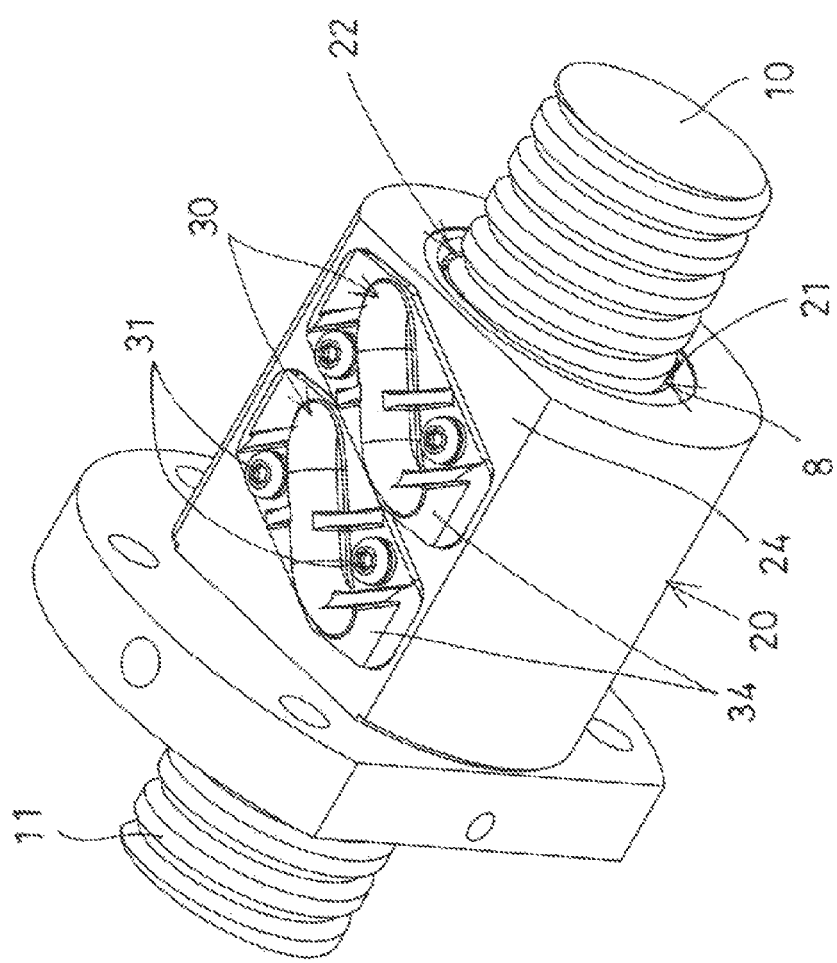
FIG. 1 is a perspective view of a ball screw device in accordance with the present invention.

Referring to the drawings, and initially to FIGS. 1-4, a ball screw device in accordance with the present invention comprises an elongated bolt or screw shaft 10 including a number of helical threaded portions or grooves 11 formed on the outer peripheral portion thereof, or formed in the outer peripheral surface thereof, and a movable member, such as a ball nut 20 including a screw hole or bore 21 formed therein for receiving or engaging with the elongated screw shaft 10, and the screw hole or bore 21 of the ball nut 20 is formed or defined by a number of helical threaded portions or grooves 22 for threading or engaging or aligning with the helical threaded portions or grooves 11 of the screw shaft 10, and for forming one or more (such as two) multiple-turn, helical ball guiding passages or raceways 8 between the screw shaft 10 and the ball nut 20, and for slidably receiving a number of ball bearing elements 80 and for facilitating the sliding or rotational movement between the two movable members 10, 20 or the screw shaft 10 and the ball nut 20.

The ball nut 20 includes a cut off portion or a flat surface 24 formed in the outer peripheral portion thereof, and includes one or more, such as two pairs of orifices 25 formed therein and intersecting or communicating with the cut off portion or flat surface 24 of the ball nut 20, and also intersecting or communicating with the ball guiding raceways 8 or the helical threaded portions or grooves 11, 22 of the screw shaft 10 and the ball nut 20 for receiving or engaging with the ball or roller deflecting or circulating devices 30 which are engaged with or attached or mounted or secured to the ball nut 20 with latches or fasteners 31 (FIG. 1) for guiding or circulating or returning the ball bearing elements 80 to move cyclically in the endless multiple-turn, helical raceway or ball guiding passage 8 of the ball screw device. The above-described structure is typical and will not be described in further details.

Figure 2:
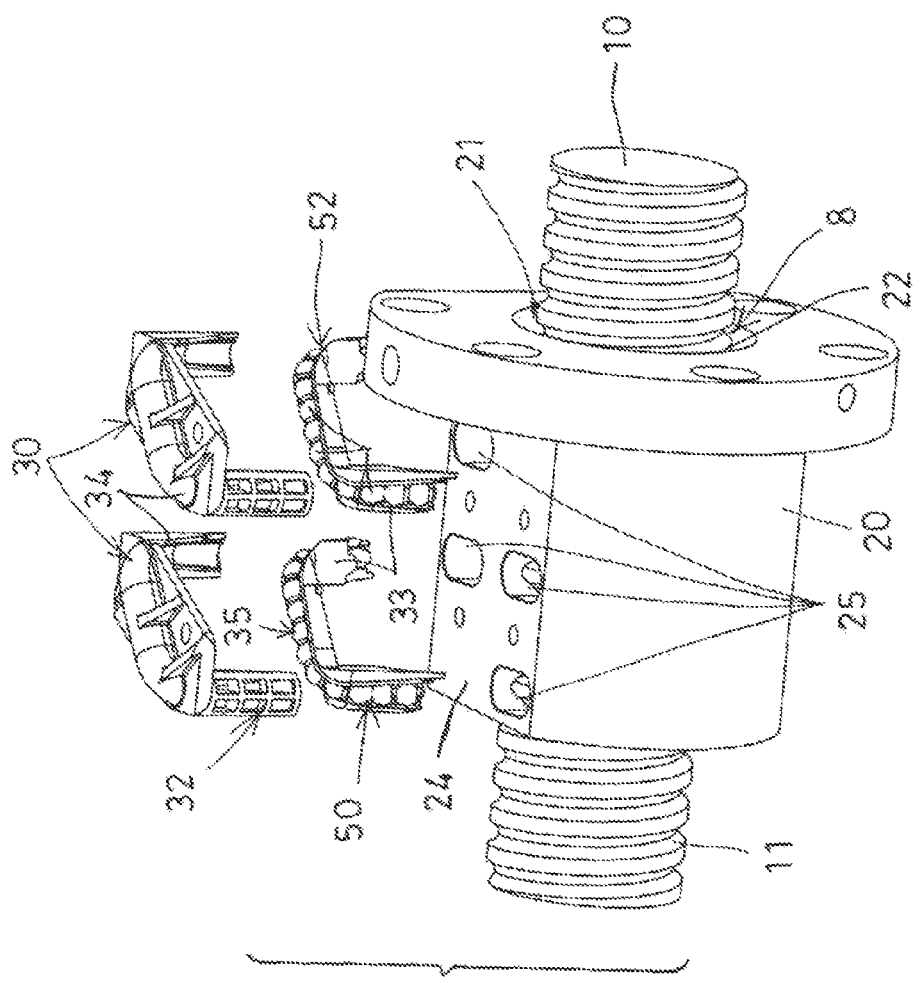
FIG. 2 is a partial exploded view of the ball screw device.
Figure 3:
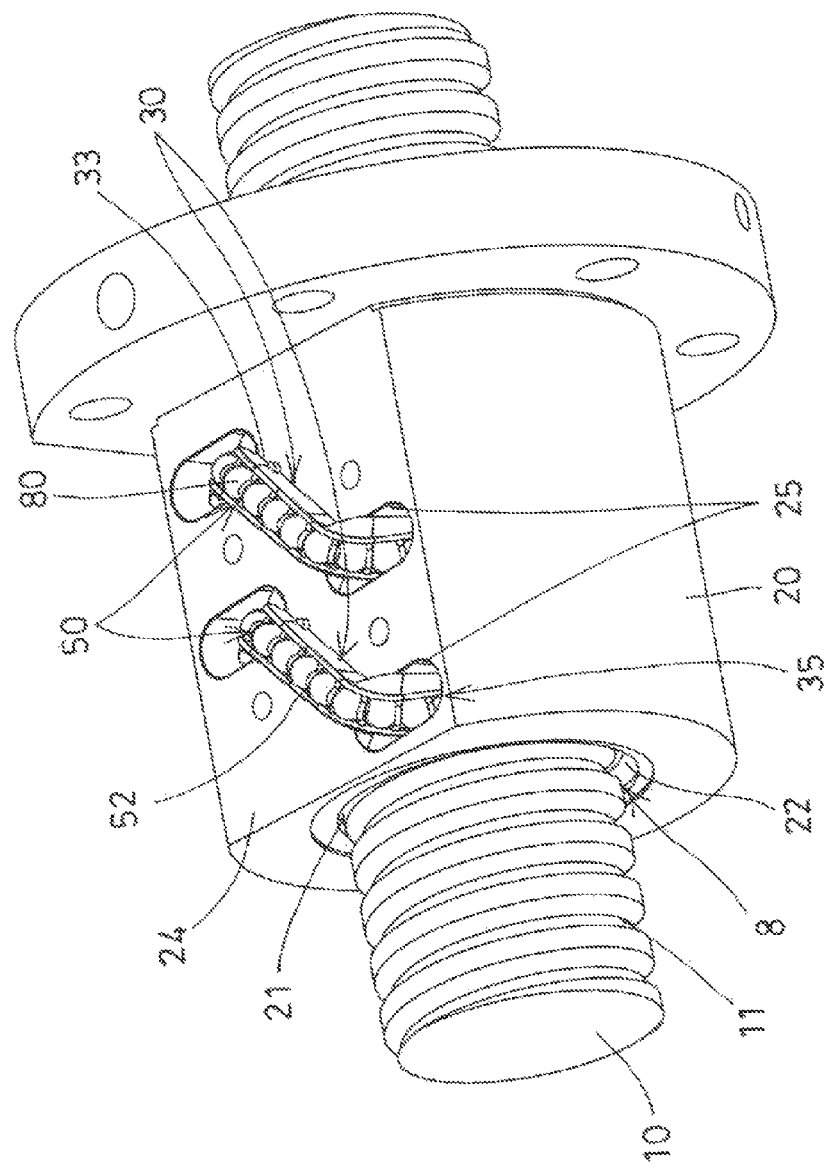
FIG. 3 is a partial perspective view of the ball screw device, in which a portion of the parts or elements have been removed for showing the structure of the flexible coupling members of the ball couplers or ball or roller element retaining device.

As shown in FIGS. 1-3, two ball or roller deflecting or circulating devices 30 have been provided for engaging with the two multiple-turn, helical ball guiding passages or raceways 8 of the ball screw device respectively, and the circulating devices 30 each include a U-shaped structure having two end segments 32 for engaging with or into the orifices 25 of the ball nut 20, and each include an inner member 33 for engaging with or onto the ball nut 20 (FIG. 3), and each include an outer member 34 for engaging with or onto the outer portion of the inner member 33 and for attaching or mounting or securing onto the ball nut 20 with the latches or fasteners 31 (FIG. 1), and each include a pathway 35 formed therein for receiving or engaging with the ball bearing elements 80, for example, the inner member 33 and the outer member 34 each include a depression or recess or a portion of the pathway 35 formed therein, and the recesses or portions of the pathway 35 of the inner member 33 and the outer member 34 may form the pathway 35 which is aligned with or communicative with the helical threaded portions or grooves 11, 22 of the screw shaft 10 and the ball nut 20 for forming an endless multiple-turn, helical ball guiding passage 8 in the ball screw device and for slidably receiving the ball bearing elements 80 when the inner member 33 and the outer member 34 are solidly attached or mounted or secured to the ball nut 20.

The ball screw device further includes one or more (such as two) ball couplers or ball or roller element retaining devices 50 for receiving or attaching or holding or supporting or engaging with the ball bearing elements 80 and for stably anchoring and positioning and guiding the ball bearing elements 80 between the screw shaft 10 and the ball nut 20 or in the endless multiple-turn, helical raceway or ball guiding passage 8 of the ball screw device and for spacing the ball bearing elements 80 from each other and for suitably facilitating the sliding movement between the screw shaft 10 and the ball nut 20. The couplers or retaining devices 50 each include one or more, such as two segments or chains 51, 52 as shown in FIGS. 2-5, or three or more segments or chains 51, 52, 53 as shown in FIG. 6.

The segments or chains 51, 52, 53 of the retaining devices 50 each include a number of spacers 54 connected or coupled together with one or more flexible coupling members or devices 55 to form a number of openings 56 between the spacers 54 and the flexible coupling members or devices 55 and for receiving or engaging with the ball bearing elements 80. It is to be noted that the segment or chain 51 may be easily and quickly engaged into the helical grooves or raceway or ball guiding passage 8 in the screw shaft 10 and the ball nut 20, and the other segment or chain 52, 53 may be easily and quickly engaged into the pathway or the recesses 35, 36 of the inner member 33 and the outer member 34 (FIGS. 2, 3) before the circulating devices 30 are solidly attached or mounted or secured to the ball nut 20 with the latches or fasteners 31.

Figure 4:
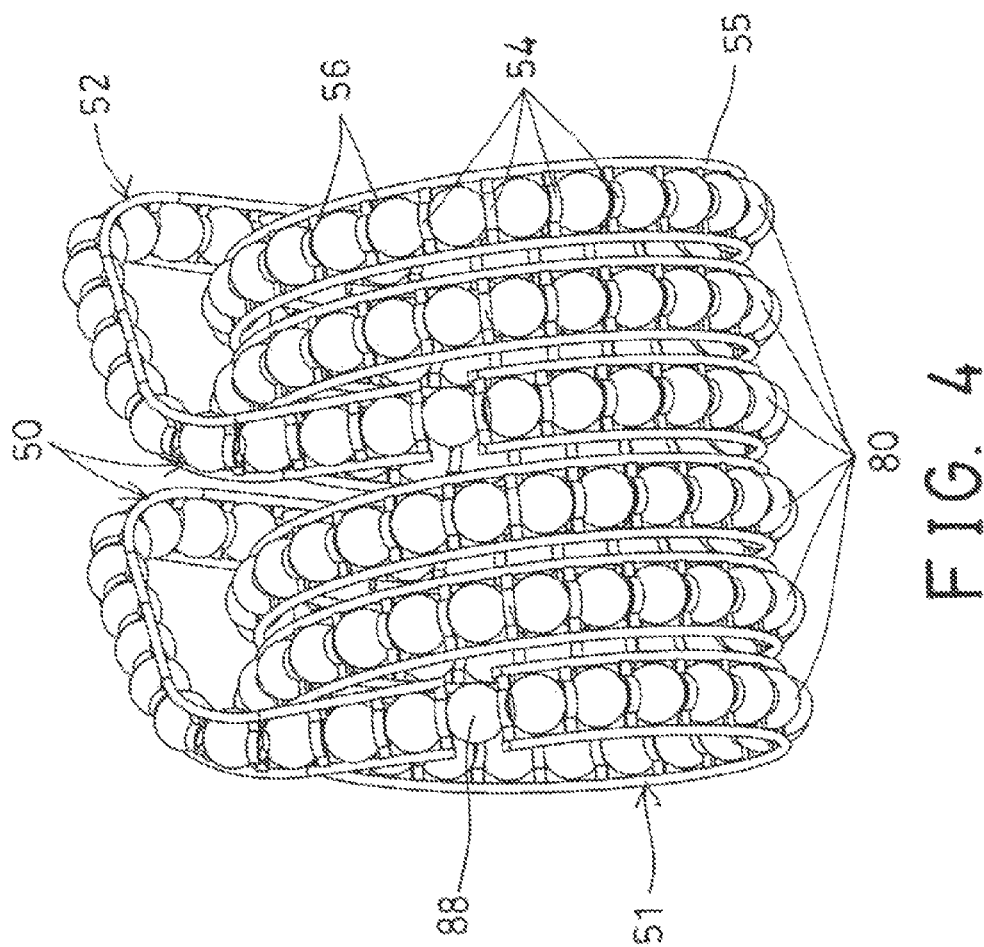
FIG. 4 is a further partial perspective view illustrating the ball couplers or ball or roller element retaining devices of the ball screw device.
Figure 5:
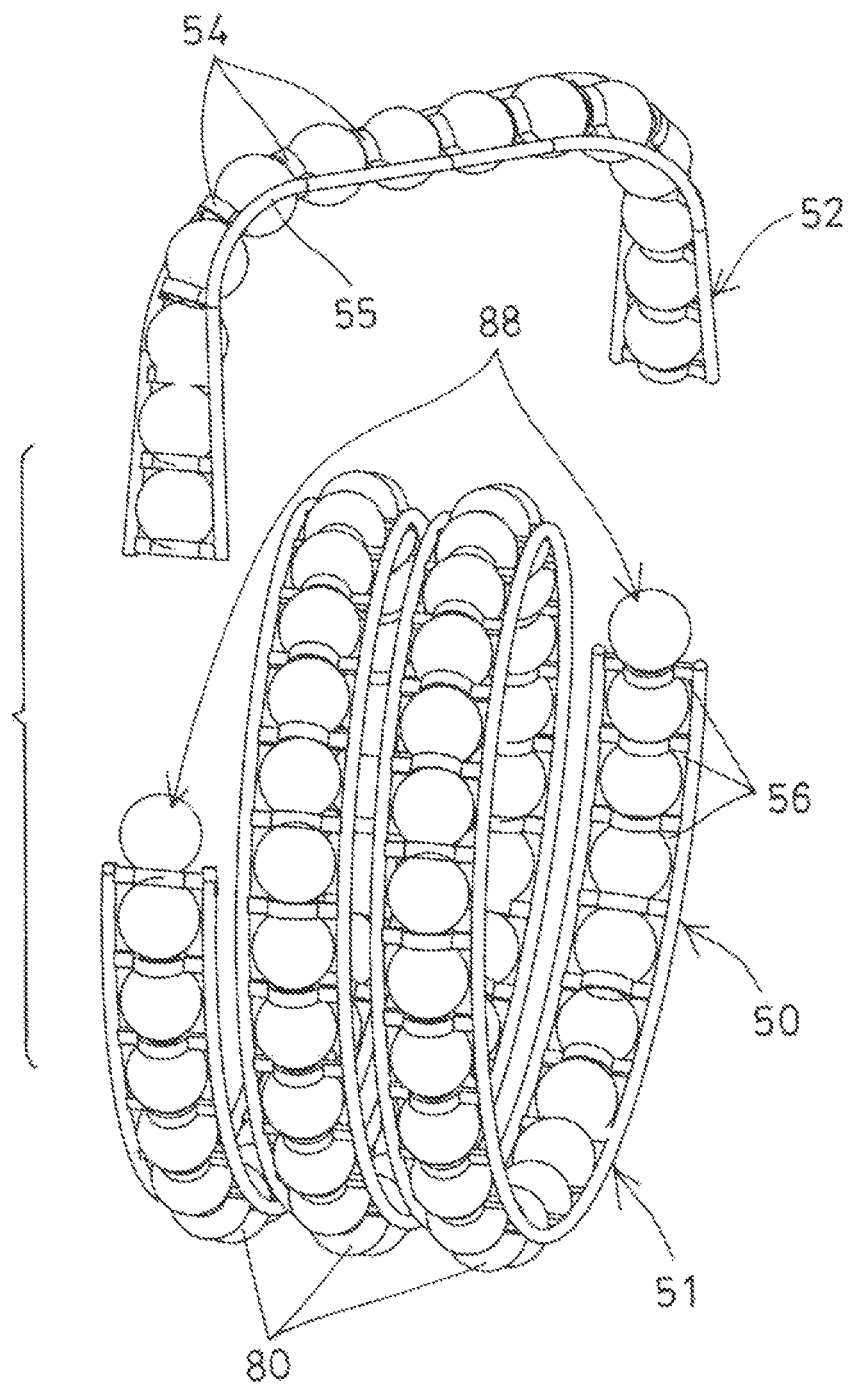
FIG. 5 is another partial exploded view illustrating one of the ball couplers or ball or roller element retaining devices of the ball screw device.
Figure 6:
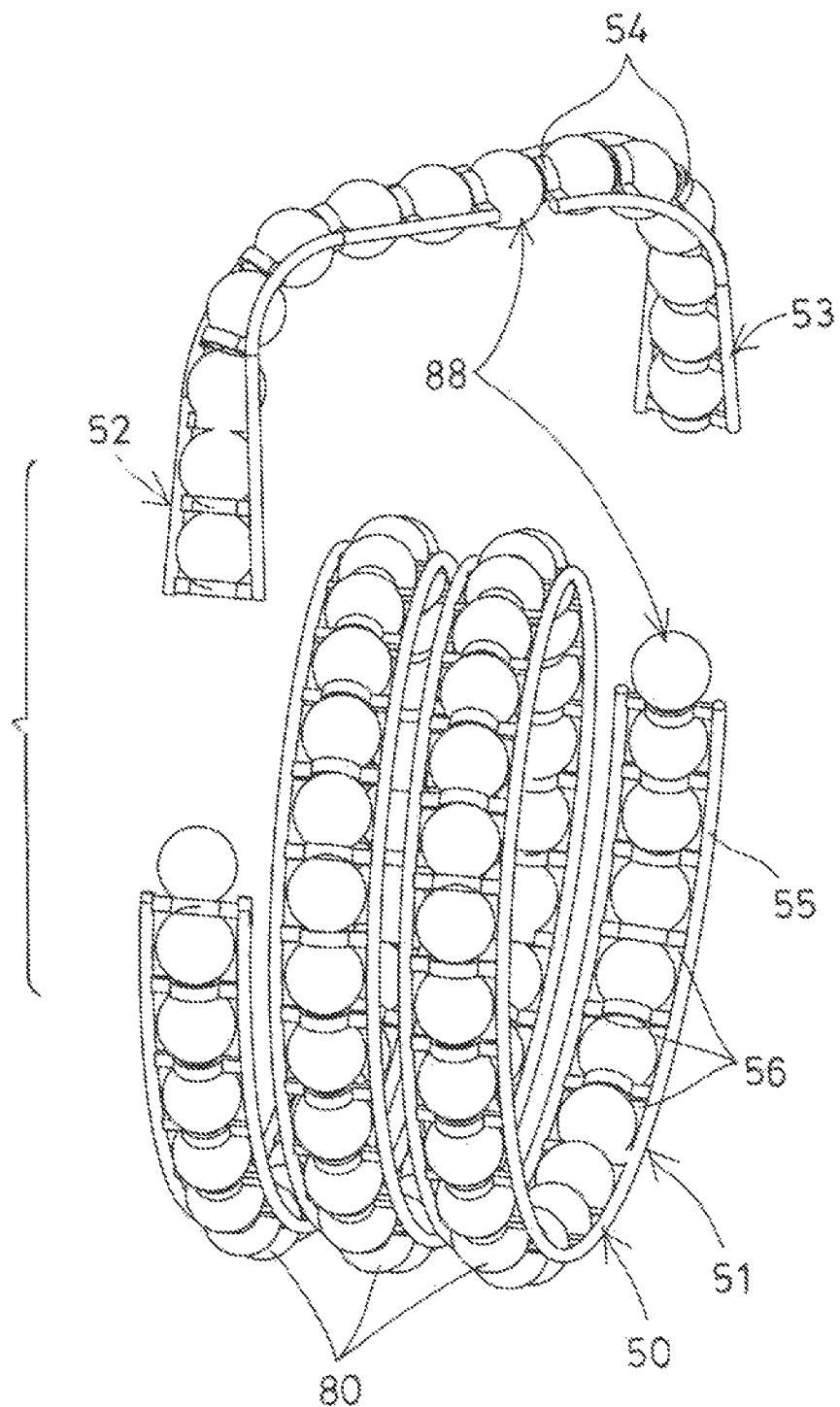
FIG. 6 is a further partial exploded view illustrating other arrangement of the ball coupler or ball or roller element retaining device of the ball screw device.
Figure 7:
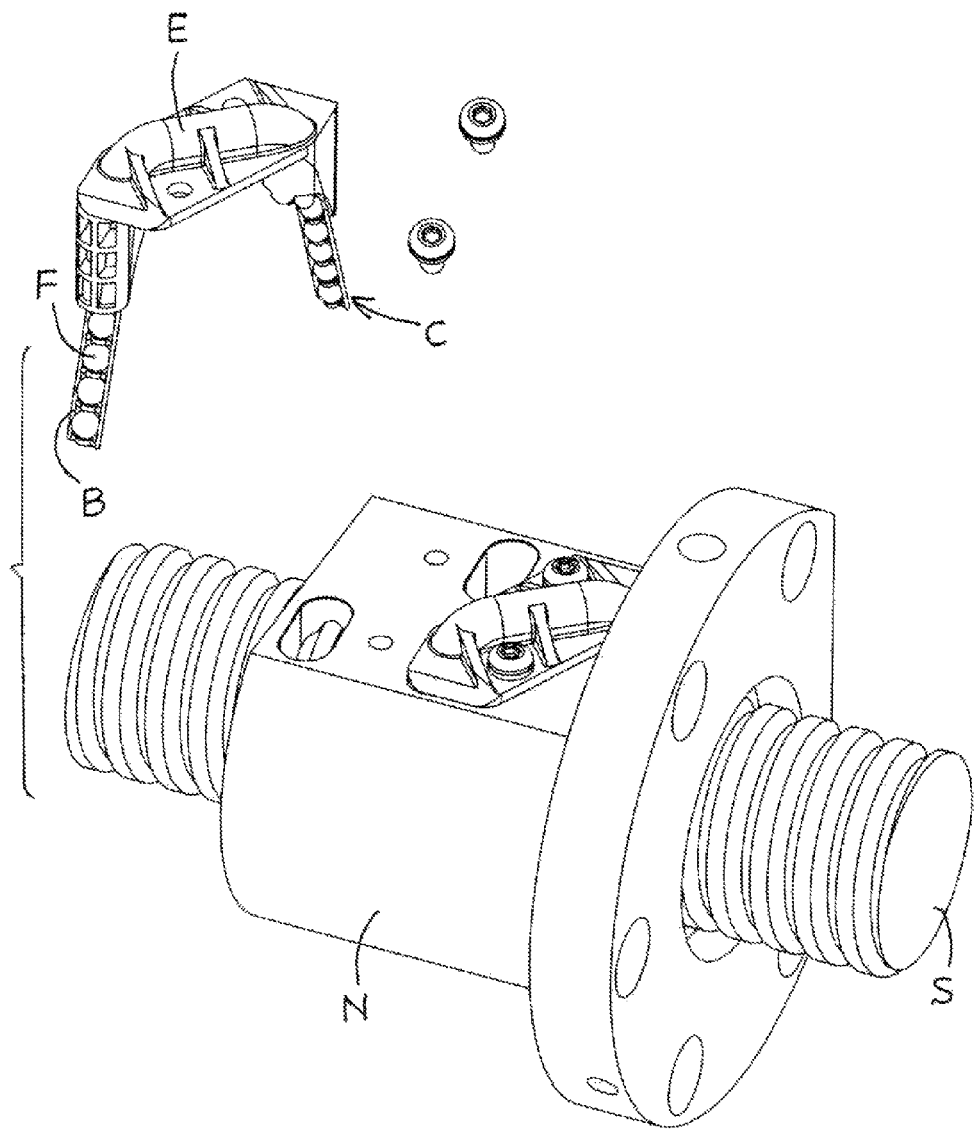
FIG. 7 is a partial exploded view illustrating one of the typical ball screw devices.

As shown in FIGS. 4-6, an additional ball or roller or bearing element 88 may further be provided and disposed or attached between the adjacent ends of the chains 51, 52, 53, for example, two additional bearing elements 88 are disposed between the adjacent ends of the two chains 51, 52 (FIG. 5) and engaged with the four O or ring shaped spacers 54 at the ends of the two chains 51, 52, and three additional bearing elements 88 are disposed between the adjacent ends of the three chains 51, 52 (FIG. 6) for allowing the bearing elements 80, 88 to be snugly fitted and received or engaged within the helical raceway or ball guiding passage 8 in the screw shaft 10 and the ball nut 20 and in the pathway or the recesses 35, 36 of the inner member 33 and the outer member 34 or of the circulating device 30. It is preferable that the chains 51, 52, 53 each include three or more bearing elements 80 disposed or mounted therein.

As also shown in FIGS. 2-5, it is preferable that the length of the chain 52 is equal to or slightly greater than or less than or close to that of the circulating device 30 and is not greater than or less than a length difference that is ranged between one to three times of the diameter of the bearing element 80, and is smaller than the length of the chain 51 (FIGS. 4, 5) for suitably and easily and quickly engaging into the pathway or the recesses 35, 36 of the inner member 33 and the outer member 34 of the circulating device 30 (FIGS. 2, 3) before the circulating devices 30 are solidly attached or mounted or secured to the ball nut 20 with the latches or fasteners 31. Or, as shown in FIG. 6, the length of the chains 52, 53 is equal to or slightly greater or less than or close to that of the circulating device 30, and is smaller than the length of the chain 51, and is not greater than or less than a length difference that is ranged between one to three times of the diameter of the bearing element 80.

Accordingly, the ball screw device in accordance with the present invention includes a screw shaft and a ball nut movable relative to each other, and a ball or roller element retaining device attached between the screw shaft and the ball nut for suitably circulating and guiding the ball bearing elements to move through an endless ball guiding passage in the ball screw device or between the two movable members.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A ball screw device comprising:
an elongated shaft including a helical groove formed on an outer peripheral portion thereof,
a ball nut movably attached onto said elongated shaft, and including a bore formed therein for receiving said elongated shaft, and including a helical groove formed therein for forming a ball guiding raceway between said ball nut and said elongated shaft,
a circulating device attached to said ball nut and including a pathway formed therein and communicative with said helical grooves and said ball guiding raceway of said screw shaft and said ball nut for forming an endless ball guiding passage between said ball nut and said elongated shaft and said circulating device,
a plurality of bearing elements received and engaged with said endless ball guiding passage of said ball nut and said elongated shaft, and
a retaining device including a plurality of spacers connected together with at least one flexible coupling device to form a plurality of openings between said spacers and said at least one flexible coupling device and for receiving said bearing elements, and
wherein said retaining device includes a first chain for engaging into said helical grooves of said screw shaft and said ball nut, and includes at least one second chain having a length smaller than a length of said first chain and equal to that of said pathway of said circulating device for engaging into said pathway of said circulating device, and two additional bearing elements are disposed between adjacent ends of said first chain and said at least one second chain and engaged with said spacers at the ends of said first chain and said at least one second chain.

2. The ball screw device as claimed in claim 1, wherein said at least one second chain includes at least three bearing elements engaged therein.

3. A ball screw device comprising:
an elongated shaft including a helical groove formed on an outer peripheral portion thereof,
a ball nut movably attached onto said elongated shaft, and including a bore formed therein for receiving said elongated shaft, and including a helical groove formed therein for forming a ball guiding raceway between said ball nut and said elongated shaft,
a circulating device attached to said ball nut and including a pathway formed therein and communicative with said helical grooves and said ball guiding raceway of said screw shaft and said ball nut for forming an endless ball guiding passage between said ball nut and said elongated shaft and said circulating device,
a plurality of bearing elements received and engaged with said endless ball guiding passage of said ball nut and said elongated shaft, and
a retaining device including a plurality of spacers connected together with at least one flexible coupling device to form a plurality of openings between said spacers and said at least one flexible coupling device and for receiving said bearing elements, and wherein said retaining device includes a first chain for engaging into said helical grooves of said screw shaft and said ball nut, and includes at least one second chain having a length smaller than a length of said first chain and no greater than that of said pathway of said circulating device for engaging into said pathway of said circulating device, and two additional bearing elements are disposed between adjacent ends of said first chain and said at least one second chain and engaged with said spacers at the ends of said first chain and said at least one second chain.

4. A ball screw device comprising:

an elongated shaft including a helical groove formed on an outer peripheral portion thereof, a ball nut movably attached onto said elongated shaft, and including a bore formed therein for receiving said elongated shaft, and including a helical groove formed therein for forming a ball guiding raceway between said ball nut and said elongated shaft, a circulating device attached to said ball nut and including a pathway formed therein and communicative with said helical grooves and said ball guiding raceway of said screw shaft and said ball nut for forming an endless ball guiding passage between said ball nut and said elongated shaft and said circulating device, a plurality of bearing elements received and engaged with said endless ball guiding passage of said ball nut and said elongated shaft, and a retaining device including a plurality of spacers connected together with at least one flexible coupling device to form a plurality of openings between said spacers and said at least one flexible coupling device and for receiving said bearing elements, and wherein said retaining device includes a first chain for engaging into said helical grooves of said screw shaft and said ball nut, and includes at least one second chain having a length smaller than a length of said first chain and no less than that of said pathway of said circulating device for engaging into said pathway of said circulating device, and two additional bearing elements are disposed between adjacent ends of said first chain and said at least one second chain and engaged with said spacers at the ends of said first chain and said at least one second chain.

* * * * *